US007534746B2

(12) United States Patent
Miller

(10) Patent No.: US 7,534,746 B2
(45) Date of Patent: *May 19, 2009

(54) METALLIC SOAPS OF MODIFIED TALL OIL ACIDS

(75) Inventor: Jeffrey J. Miller, Spring, TX (US)

(73) Assignee: Halliburton Energy Services, Inc., Duncan, OK (US)

( * ) Notice: Subject to any disclaimer, the term of this patent is extended or adjusted under 35 U.S.C. 154(b) by 720 days.

This patent is subject to a terminal disclaimer.

(21) Appl. No.: 11/046,473

(22) Filed: Jan. 28, 2005

(65) Prior Publication Data

US 2005/0137093 A1  Jun. 23, 2005

Related U.S. Application Data

(63) Continuation-in-part of application No. 10/794,107, filed on Mar. 5, 2004, now Pat. No. 7,271,132, which is a continuation-in-part of application No. 10/611,009, filed on Jul. 1, 2003, now Pat. No. 7,008,907, which is a continuation-in-part of application No. 09/999,799, filed on Oct. 31, 2001, now Pat. No. 6,620,770.

(51) Int. Cl.
*C09K 8/508* (2006.01)

(52) U.S. Cl. .................. 507/138; 507/117; 507/129; 507/131; 507/133; 507/137

(58) Field of Classification Search ................ None
See application file for complete search history.

(56) References Cited

U.S. PATENT DOCUMENTS

| 2,816,073 | A | 12/1957 | Straton |
| 3,684,012 | A | 8/1972 | Scheffel et al. |
| 3,878,117 | A | 4/1975 | Williams et al. |
| 3,912,683 | A | 10/1975 | O'Farrell |
| 3,933,780 | A | 1/1976 | Ward |
| 3,954,627 | A | 5/1976 | Dreher et al. |
| 4,007,149 | A | 2/1977 | Burton et al. |
| 4,012,329 | A | 3/1977 | Hayes et al. |
| 4,081,462 | A | 3/1978 | Powers et al. |
| 4,148,821 | A | 4/1979 | Nussbaum et al. |
| 4,153,588 | A | 5/1979 | Makowski et al. |
| 4,390,474 | A | 6/1983 | Nussbaum et al. |
| 4,425,462 | A | 1/1984 | Turner et al. |
| 4,447,338 | A | 5/1984 | Lundberg et al. |
| 4,460,484 | A | 7/1984 | Force |
| 4,488,975 | A | 12/1984 | Almond |
| 4,508,628 | A | 4/1985 | Walker et al. |
| 4,552,215 | A | 11/1985 | Almond et al. |
| 4,553,601 | A | 11/1985 | Almond et al. |
| 4,658,036 | A * | 4/1987 | Schilling .................. 548/513 |
| 4,671,883 | A | 6/1987 | Connel et al. |
| 4,787,990 | A | 11/1988 | Boyd |
| 4,802,998 | A | 2/1989 | Mueller et al. |
| 4,810,355 | A | 3/1989 | Hopkins |
| 4,900,456 | A | 2/1990 | Ogilvy |
| 4,927,669 | A | 5/1990 | Knox et al. |
| 4,964,615 | A | 10/1990 | Mueller et al. |
| 5,045,219 | A | 9/1991 | Trahan et al. |
| 5,053,534 | A | 10/1991 | Cosgrove |
| 5,096,883 | A | 3/1992 | Mercer et al. |
| 5,106,516 | A | 4/1992 | Mueller et al. |
| 5,182,326 | A | 1/1993 | LeBlanc et al. |
| 5,189,012 | A | 2/1993 | Patel et al. |
| 5,194,640 | A | 3/1993 | Cosgrove et al. |
| 5,232,910 | A | 8/1993 | Mueller et al. |
| 5,237,080 | A | 8/1993 | Daute et al. |
| 5,252,531 | A | 10/1993 | Yasuda et al. |
| 5,252,554 | A | 10/1993 | Mueller et al. |
| 5,254,531 | A | 10/1993 | Mueller et al. |

(Continued)

FOREIGN PATENT DOCUMENTS

| AU | B 75043/94 | 3/1995 |
| EP | 0134173 A1 | 3/1985 |
| EP | 0124194 B1 | 3/1988 |
| EP | 0247801 B1 | 11/1990 |
| EP | 0254412 B1 | 2/1992 |
| EP | 0561608 | 3/1993 |
| EP | 1424380 A1 | 6/2004 |
| EP | 1496096 A2 | 1/2005 |

(Continued)

OTHER PUBLICATIONS

SPE 12119, Boyd, P.A., et al., "New Base Oil Used in Low-Toxicity Oil Muds", 10 pgs, Jan. 1985.
Baroid Fluids Handbook, Synthetics, p. 13-3 to 13-27, Revised Aug. 1, 1997.
"Second-Generation Sytnthetic Drilling Fluids", Friedheim, J.E., p. 724-728, Journal Petroleum Engineers, Jul. 1997.
Shell Chemicals, NEODOL 23-6.5 Primary Alcohol Ethoxylate, 2 pgs., Oct. 2005.

*Primary Examiner*—James Seidleck
*Assistant Examiner*—John J Figueroa
(74) *Attorney, Agent, or Firm*—Craig W. Roddy; Karen Tripp

(57) ABSTRACT

A method and product is disclosed which provides emulsion stability and filtration control to invert emulsion drilling fluids. The product comprises a blend of a carboxylic acid terminated polyamide with distilled and processed tall oil fatty acids and/or distilled and processed tall oil resin acids. The product is extremely effective, even at temperatures as high as 350° F., decreasing by about two-thirds the amount of emulsifier generally required to formulate an effective drilling fluid. The product also greatly reduces and in many cases eliminates the need for conventional fluid loss additives, and additionally provides electrical stability. Moreover, the product has a pour point as low as about 20 degrees Fahrenheit with minimal solvents, thereby eliminating the need to ship large amounts of inert material for use, and may be transported in a highly active state.

20 Claims, No Drawings

U.S. PATENT DOCUMENTS

| | | |
|---|---|---|
| 5,260,268 A | 11/1993 | Forsberg et al. |
| 5,308,401 A | 5/1994 | Geke et al. |
| 5,318,954 A | 6/1994 | Mueller et al. |
| 5,318,955 A | 6/1994 | Mueller et al. |
| 5,318,956 A | 6/1994 | Mueller et al. |
| 5,330,662 A | 7/1994 | Jahnke et al. |
| 5,333,698 A | 8/1994 | Van Slyke |
| 5,403,508 A | 4/1995 | Reng et al. |
| 5,403,822 A | 4/1995 | Mueller et al. |
| 5,432,152 A | 7/1995 | Dawson et al. |
| 5,441,927 A | 8/1995 | Mueller et al. |
| 5,461,028 A | 10/1995 | Mueller et al. |
| 5,498,596 A | 3/1996 | Ashjian et al. |
| 5,508,258 A | 4/1996 | Mueller et al. |
| 5,569,642 A | 10/1996 | Lin |
| 5,589,442 A | 12/1996 | Gee et al. |
| 5,593,954 A | 1/1997 | Malchow, Jr. |
| 5,607,901 A | 3/1997 | Toups, Jr. et al. |
| 5,635,457 A | 6/1997 | Van Slyke |
| 5,744,677 A | 4/1998 | Wu |
| 5,837,655 A | 11/1998 | Halliday et al. |
| 5,846,913 A | 12/1998 | Sawdon |
| 5,849,974 A | 12/1998 | Clarembeau et al. |
| RE36,066 E | 1/1999 | Mueller et al. |
| 5,869,434 A | 2/1999 | Mueller et al. |
| 5,877,378 A | 3/1999 | Overstreet et al. |
| 5,909,779 A | 6/1999 | Patel et al. |
| 5,929,297 A | 7/1999 | Theriot et al. |
| 5,958,845 A | 9/1999 | Van Slyke |
| 6,001,790 A | 12/1999 | Schmitt et al. |
| 6,022,833 A | 2/2000 | Mueller et al. |
| 6,034,037 A | 3/2000 | Van Slyke |
| 6,090,754 A | 7/2000 | Chan et al. |
| 6,107,255 A | 8/2000 | Van Slyke |
| 6,110,874 A | 8/2000 | Van Slyke |
| 6,165,946 A | 12/2000 | Mueller et al. |
| 6,180,572 B1 | 1/2001 | Mueller et al. |
| 6,211,119 B1 | 4/2001 | Herold et al. |
| 6,620,700 B2 | 9/2003 | Prinslow et al. |
| 6,620,770 B1 | 9/2003 | Kirsner et al. |
| 7,008,907 B2 | 3/2006 | Kirsner et al. |
| 7,271,132 B2 * | 9/2007 | Miller ................. 507/137 |
| 2004/0059032 A1 | 3/2004 | He |
| 2004/0171727 A1 * | 9/2004 | Winters et al. ............. 524/270 |
| 2005/0037929 A1 | 2/2005 | Kirsner et al. |

FOREIGN PATENT DOCUMENTS

| | | |
|---|---|---|
| GB | 2166782 A | 5/1986 |
| GB | 2212192 | 11/1988 |
| GB | 2287052 A | 9/1995 |
| GB | 2309240 A | 7/1997 |
| WO | WO 83/02949 | 9/1983 |
| WO | WO 93/23491 | 11/1993 |
| WO | WO 94/16030 | 7/1994 |
| WO | WO 95/06694 | 3/1995 |
| WO | WO 95/09215 | 4/1995 |
| WO | WO 95/21225 | 8/1995 |
| WO | WO 98/01882 | 5/1998 |
| WO | WO 99/50370 | 9/1999 |
| WO | WO 00/71241 A1 | 11/2000 |
| WO | WO 03/038008 | 5/2003 |
| WO | WO 2006/079778 | 8/2006 |

\* cited by examiner

METALLIC SOAPS OF MODIFIED TALL OIL ACIDS

RELATED APPLICATION

This application is a continuation-in-part of U.S. patent application Ser. No. 10/794,107, filed Mar. 5, 2004, issued as U.S. Pat. No. 7,271,132 on Sept. 18, 2007, which is a continuation-in-part of U.S. patent application Ser. No. 10/611,009, filed Jul. 1, 2003, issued as U.S. Pat. No. 7,008,907 on Mar. 7, 2006, which is a continuation-in-part of U.S. patent application Ser. No. 09/999,799, filed Oct. 31, 2001, issued as U.S. Pat. No. 6,620,770 on Sept. 16, 2003.

BACKGROUND OF THE INVENTION

1. Field of the Invention

The present invention relates to methods for drilling boreholes in subterranean formations, particularly hydrocarbon bearing formations, and to drilling fluids for use in such drilling operations. More particularly, the present invention relates to oil or synthetic based drilling fluids, fluids comprising invert emulsions, and most particularly drilling fluid additives and methods for making such additives that facilitate or enhance emulsification, electrical stability or filtration properties of the drilling fluid.

2. Description of Relevant Art

A drilling fluid or mud is a specially designed fluid that is circulated through a wellbore as the wellbore is being drilled to facilitate the drilling operation. The various functions of a drilling fluid include removing drill cuttings from the wellbore, cooling and lubricating the drill bit, aiding in support of the drill pipe and drill bit, and providing a hydrostatic head to maintain the integrity of the wellbore walls and prevent well blowouts. Specific drilling fluid systems are selected to optimize a drilling operation in accordance with the characteristics of a particular geological formation.

Oil or synthetic-based muds, or invert emulsions, are normally used to drill swelling or sloughing shales, salt, gypsum, anhydrite or other evaporite formations, hydrogen sulfide-containing formations, and hot (greater than about 300 degrees Fahrenheit) holes, but may be used in other holes penetrating a subterranean formation as well. These non-aqueous based drilling fluids typically contain oil or a synthetic oil or other synthetic material or synthetic fluid ("synthetic") as the continuous phase and may also contain water which is dispersed in the continuous phase by emulsification so that there is no distinct layer of water in the fluid. The term "oil mud" or "oil or synthetic-based mud" typically means an invert oil mud emulsion or invert emulsion. An all oil mud simply comprises 100% oil by volume as the liquid phase; that is, there is no aqueous internal phase. An invert emulsion drilling fluid may commonly comprise between about 50:50 to 95:5 by volume oil phase to water phase.

Most commonly, invert emulsions used in drilling typically comprise: a base oil or synthetic fluid for the external phase; a saline, aqueous solution for the internal phase (typically a solution comprising about 30% calcium chloride); and other agents or additives for suspension, fluid loss, density, oil-wetting, emulsification, filtration, and rheology control. With space at some well sites limited, such as on offshore platforms, and with increasing costs of transport of materials to a wellsite, there is industry-wide interest in, and on-going need for, more efficient and concentrated drilling fluid additives and for drilling fluids which can be formulated and maintained with minimal or fewer additives than common with prior art drilling fluids.

In response to this quest, U.S. Pat. No. 6,620,770, entitled "Additive of Oil-Based Drilling Fluids," issued Sep. 16, 2003, to Jeff Kirsner, Jeff Miller, and Jon Bracken, taught a blend of a carboxylic acid terminated polyamide and a mixture produced by the Diels-Alder reaction of dienophiles with a mixture of fatty acids and resin acids preferably derived from the distillation of crude tall oil for providing emulsion stability and filtration control to invert emulsions and other oil or synthetic based drilling fluids for use in drilling boreholes in subterranean formations. That blend has a pour point at temperatures as low as about 20 degrees Fahrenheit with minimal solvent, enabling it to be transported in a highly (about 90% to about 100%) active state, which reduces the need to inventory products containing different solvents for compatibility with the drilling fluid. That blend also provides high levels of filtration control to a drilling fluid made with conventional emulsifiers at temperatures up to about 250° F. However, at higher temperatures (over about 250° F.), the blend requires other additives to stabilize fluid loss and after exposure to such high temperatures (over about 250° F.), the blend may have an undesirable thinning effect on the drilling fluid.

Consequently, the quest continues for more efficient and concentrated drilling fluid additives, and for drilling fluids which can be formulated and maintained with minimal or fewer additives than common with prior art drilling fluids, that can also tolerate or perform well at temperatures over about 250° F., and particularly at temperatures as high as about 350° F. or higher.

SUMMARY OF THE INVENTION

I have discovered that by using distilled and processed tall oil fatty acids and/or distilled and processed tall oil resin acids instead of fatty acids and resin acids simply derived from distilled crude tall oil in preparing the additive taught in U.S. Pat. No. 6,620,770, an improved material or product can be obtained for providing emulsion stability and filtration control to invert emulsions and other oil or synthetic based drilling fluids for use in drilling boreholes in subterranean formations, particularly hydrocarbon bearing formations. Advantageously, the product of the invention can provide enhanced filtration control and greater rheological stability to the drilling fluid at higher temperatures, such as about 350° F., and the product also has longer storage stability than the additive of U.S. Pat. No. 6,620,770.

In addition to these significant improvements, the product of the present invention has other characteristics or performance capabilities considered advantageous in invert emulsions and other oil or synthetic based drilling fluids to the same extent or even better than previously known products. That is, the product of the present invention has a pour point at temperatures as low as about 20° F. with minimal solvent, and thus may be transported in a highly (about 90% to about 100%) active state. This feature reduces the need to inventory products containing different solvents for compatibility with the drilling fluid and further eliminates the need for shipping large amounts of inert material. Still further, the product of this invention, when added to drilling fluids, reduces or eliminates the need for conventional fluid loss additives, even at temperatures as high as about 350° F.

The product of this invention comprises two primary components or parts. One part is a wetting agent which is most preferably carboxylic acid-terminated polyamide, and the other part is a mixture of distilled and processed tall oil fatty acids and/or distilled and processed tall oil resin acids. For use in the present invention, tall oil fatty acids are processed, after distillation, by reacting them for adduction. Such adduction may be obtained with a cyclo addition, Diels Alder type reaction, preferably using carboxylic acids, polycarboxylic acids, acid anhydrides, or combinations or mixes thereof, or with "ene" substitution, such as taught for example in U.S. Pat. No. 3,933,780, issued Jan. 20, 1976, to Benjamin F. Ward. One example preferred adduction is with maleic anhydride so that maleic anhydride adducted tall oil fatty acids are obtained. Unreacted tall oil fatty acids may be added to the processed (i.e., adducted) tall oil fatty acids to reduce viscosity of the reacted tall oil fatty acids. The tall oil resin acids are similarly processed, after distillation, by reacting them for adduction, which may be accomplished in the same or similar manner described for the tall oil fatty acids. If for example maleic anhydride is used for the adduction, maleic anhydride adducted tall oil resin acids will be obtained. Solid adducted resin acids are dissolved in tall oil fatty acids while heating for better delivery characteristics.

The two primary components or parts of the product of the invention are blended or mixed, producing formulas with two or three times the amount of key compounds, namely distilled and processed tall oil fatty acids (and/or distilled and processed tall oil resin acids if adducted tall oil resin acids are used) compared with formulas prepared according to U.S. Pat. No. 6,620,770. In contrast to U.S. Pat. No. 6,620,770, a mixture of the fatty acids and the resin acids is not needed to achieve similar and possibly even better performance than the product of U.S. Pat. No. 6,620,770. That is, use of the distilled and processed tall oil fatty acids without the distilled and processed tall oil resin acids may be sufficient in the blend. Similarly, use of the distilled and processed tall oil resin acids without the distilled and processed tall oil fatty acids may be sufficient in the blend. However, a mixture of distilled and processed tall oil fatty acids and distilled and processed tall oil resin acids in the blend will yield the best overall properties.

After blending together of the primary components of the product of the invention, the blend is further reacted with cations to form soaps. This saponification reaction may be achieved in the manufacturing process or it may be effected "in situ" by the presence of or addition of cations to the drilling fluid. As used herein, the term "in situ" shall be understood to mean in the drilling fluid. Typically, such saponification reaction will occur in the drilling fluid when the drilling fluid is being prepared for use as a drilling fluid or when the drilling fluid is in use as a drilling fluid in drilling a borehole in a subterranean formation. Drilling fluids commonly comprise cations. Sources of such cations include, without limitation, lime, quicklime, and calcium chloride, among others. Further, drilling fluids may incorporate cations contacted in or available from the subterranean formation itself.

Alternatively, a metallic soap of the blend may be made by reacting the blend with lime or other alkaline materials to produce a powder-form product, as taught in U.S. patent application Ser. No. 10/749,107, filed Mar. 5, 2004, entitled Metallic Soaps of Modified Fatty Acids and Rosin Acids by Jeffrey J. Miller. In the dry process, the blend is preferably mixed with enough oxide to theoretically or stoichiometrically complete the saponification reaction, and is most preferably mixed with at least about twice the amount of oxide stoichiometrically needed to neutralize the acid value of the blend. Heat may be applied to increase the rate of the reaction. The reaction product, a solid, is preferably ground into a powder. The presence of any excess oxide in the powder may help keep the powder from consolidating during storage or transport. Inert filler may optionally be added to the powder for this purpose as well.

The method of the invention is directed to employing the product of the invention for improved drilling fluids and improved drilling of boreholes in subterranean formations.

DETAILED DESCRIPTION OF PREFERRED EMBODIMENTS

The product of the invention comprises a blend, mixture, or a combination (hereinafter "blend) of a wetting agent ("Component 'A'"), which is preferably carboxylic acid-terminated polyamide, and distilled and processed tall oil fatty acids and/or distilled and processed tall oil resin acids ("Component 'B'").

Component A is a wetting agent, preferably concentrated (i.e., about 90% active), and typically made from the condensation reaction between unreacted and unmodified fatty acids and polyamines. The fatty acids and polyamines are reacted in such proportion as to create a "partial amide" intermediate product having a mole ratio of the reactive acid sites to amine sites ranging from about 0.5:1 to about 0.75:1 and most preferably about 0.6:1. This partial amide intermediate product is diluted with a minimum amount of solvent, as needed for further processing, and the remaining amine sites are further reacted with an acid anhydride or polycarboxylic acid to produce carboxylic acid-terminated polyamide. A most preferred carboxylic acid-terminated fatty polyamide for use in the invention is EZ-MUL™ NT CONCENTRATE product, the active constituent of EZ-MUL™ NT product available from Halliburton Energy Services, Inc. in Houston, Tex., although other carboxylic acid terminated fatty polyamides are believed to be useable, as well other wetting agents that perform similarly. For example, lecithin and long hydrocarbon chain cationic surfactants are alternative wetting agents that might be used for Component A.

Component B consists of highly modified reaction products of multiply distilled tall oil fatty acids, or highly modified reaction products of multiply distilled tall oil resin acids, or both, rather than a modified mixture of tall oil fatty acids and resin acids as taught in U.S. Pat. No. 6,620,770. The difference is more than semantics. That is, Component B of the present invention has undergone not only distillation to remove generally unsaponifiable compounds such as pitch but has undergone further distillation to separate the fatty acids from the resin (or rosin) acids. Such multiply distilled fatty acids and multiply distilled resin acids separated one from the other are capable of greater adduction modification than a mixture of fatty acids and resin acids and result in a greater amount of modified compounds—a higher percentage of adducted fatty acids and/or adducted resin acids—than obtainable with acceptable viscosity (for use in drilling fluids) with the modified mixture of tall oil fatty acids and resin acids taught in U.S. Pat. No. 6,620,770. For example, a blend of the present invention may contain 30% by weight modified fatty acids and modified resin acids and have a similar or lower viscosity than a blend of U.S. Pat. No. 6,620,770 containing only 8% modified fatty and resin acids, whereas efforts to prepare a blend according to U.S. Pat. No. 6,620,770 with 30% by weight modified fatty and resin acids would result in a product too viscous to be useable and probably too viscous to make. Higher percentages of modified (i.e., adducted) fatty acids and modified (i.e., adducted) resin acids are desirable because it is believed that they enable the blend to impart better properties to the drilling fluid, particularly with respect to preventing HTHP fluid loss and improving emulsification in invert emulsion systems at high temperatures.

Crude tall oil is a complex mixture generally formed from acid treatment of soap skimmings isolated from alkaline liquors in wood pulp manufacturing processes. Tall oil refining operations remove the tar-like compounds known as pitch before further refractionation and distillation to isolate neutral compounds and to resolve the more valuable carboxylic acids. Distillation with steam under vacuum is typically applied to yield various grades of the two primary tall oil products: fatty acids and resin acids. Tall oil fatty acid and resin acid distillation products were preferentially used in the product taught in U.S. Pat. No. 6,620,770. However, the modification process taught in that patent, that is, first providing a blend of these fatty acid and resin acid products and then reacting them with dienophiles in a Diels-Alder reaction, generally prevents the higher levels of modification of the fatty acids and resin acids used in the present invention, and even if achievable would yield a product of such high viscosity that it would be unusable.

The modification of the tall oil fatty acids and tall oil resin acids for the present invention is obtained by reacting the tall oil fatty acids for adduction after distillation separately from reacting the tall oil resin acids for adduction after distillation. Such adduction may be Diels Alder cyclo addition, obtained with an anhydride reaction, preferably using carboxylic acids, polycarboxylic acids, acid anhydrides, or combinations or mixes thereof, or may be "ene" type addition or substitution such as taught for example in U.S. Pat. No. 3,933,780, issued Jan. 20, 1976, to Benjamin F. Ward. One preferred example adduction is with maleic anhydride so that maleic anhydride adducted tall oil fatty acids or maleic anhydride adducted tall oil resin acids are obtained. Unreacted tall oil fatty acids may be added to the processed (i.e., adducted) tall oil fatty acids to reduce viscosity of the reacted tall oil fatty acids. Solid adducted resin acids are dissolved in tall oil fatty acids while heating. The level of adduction of the fatty acids and/or resin acids preferably should be at least about 40%.

Crude tall oil is known to have storage stability problems; such problems are readily apparent when the resin acids fall out of solution and accumulate over time at the bottom of storage containers. However, the stability of distilled and processed tall oil fatty acids and distilled and processed tall oil resin acids is greatly enhanced, with the settling problems encountered with crude tall oil essentially eliminated.

Distilled and processed tall oil fatty acids and distilled and processed tall oil resin acids yield superior performance in blending with polyamide to yield the product of the invention. However, such distilled and processed tall oil fatty acids and distilled and processed tall oil resin acids alone, without blending with polyamide, are not effective for achieving the advantages of the invention. Carboxylic acid-terminated fatty polyamides alone also cannot achieve all of the advantages of the invention. In the combination disclosed, however, the blend (or mixture) comprising the product of the invention provides a marked advance in the art, even superior to the product of U.S. Pat. No. 6,620,770.

The blend comprising the product of the invention is preferably made by blending, mixing, or combining together Component A and Component B, preferably in a ratio of about 1:5 to about 1:1. Ratios of Component A to Component B of about 1:2 to about 1:3 are most preferred. The exact ratio of these two components or parts may vary greatly depending on the exact desired characteristics of the product. Preferably, however, the quantity of Component B will exceed the quantity of Component A. After blending, the components are reacted with cations to form soaps. Such reaction or saponification may be achieved as part of the manufacturing process of the product of the invention or may be effected in situ the drilling fluid by the presence or addition of cations to the drilling fluid. Calcium cations are preferred and may be obtained, for example, by reacting the polyamide and modified fatty acid/resin acid components with lime, quicklime, or calcium chloride. An alternative powder-form of the product may be made as taught in U.S. patent application Ser. No. 10/749,107, filed Mar. 5, 2004, entitled *Metallic Soaps of Modified Fatty Acids and Rosin Acids* by Jeffrey J. Miller.

The product of the invention is a powerfully efficient additive for oil or synthetic based drilling fluids, affording or effecting enhanced emulsification, and improved electrical stability and fluid loss control, with significantly less volume of additive than previously known or available with prior art drilling fluid additives at higher temperatures of over 250° F. to about 350° F. The product effects or helps facilitate emulsification typically in relatively small amounts, that is, amounts of about three pounds to about five pounds of the product of the invention per barrel of drilling fluid, and even lower quantities can improve the electrical stability and filtration control of drilling fluids, even if already emulsified with other emulsifiers.

The product of the invention does not rely on a carrier. The material comprising the product is highly active and is believed to be useful with all or substantially all synthetic and oil-based systems known to be effective for drilling fluids. The product of the invention may also add viscosity to the drilling fluid and thus is preferably added to the base drilling fluid before any weighting agents such as barite, for example, are added.

The product of this invention imparts stable fluid properties to the drilling fluid even at temperatures up to (and including) about 350° F. without filtration control additives or with a relatively minor (trace such as for example a pound or two a barrel) or greatly reduced amount of filtration control additives. Adding additional wetting agents along with the product of the invention in an emulsifier package may improve the oil-wetting nature of the drilling fluid in some base oils but will not be needed in others. The addition of wetting agents to drilling fluids comprising the product of the invention may also further enhance performance of some fluid systems.

The product of the invention has a high acid value. Consequently, improved results may be seen when a neutralizer or neutralizing agent is added to the drilling fluid. For example, a minimum of about four pounds of lime (or similar saponifying agent) might favorably be added per barrel of drilling fluid when about three pounds per barrel of the product of the invention are used in the drilling fluid. Additional lime (or similar saponifying agent) may be helpful or needed with larger quantities of product of the invention for optimum results, although satisfactory results might also be obtained with less.

Care is recommended when using the product of this invention to avoid over-treating. Excess emulsifiers (i.e., more than needed to effect emulsification) in drilling fluids can contribute to high fluid viscosity at cold temperatures (i.e., temperatures less than about 45 degrees Fahrenheit). For deepwater operations (i.e., use of drilling fluids at depths of water greater than about 500 feet and at temperatures less than about 45 degrees Fahrenheit), additional wetting agents may preferably be added to help maintain low riser viscosities as drill solids are incorporated in or become carried by the drilling fluid.

The method of the invention comprises adding the product of the invention to an oil or synthetic based drilling fluid or employing a drilling fluid comprising the product of the invention in drilling a borehole in a subterranean formation. In another embodiment, the method of the invention comprises adding the product of the invention to an oil or synthetic based drilling fluid to facilitate or improve emulsification of the drilling fluid or the formation of invert emulsions.

Experiments were conducted that demonstrate or exemplify the invention. Several formulations (20R, 10RF, 15RF, 20F, and 67F) of products of the invention were prepared for comparison to each other and to a formulation (D2) of U.S. Pat. No. 6,620,770. The components of these various formulations are set forth in Table 1.

TABLE 1

Composition of Modified Tall Oil Blends

|  | D2 | 20R | 10RF | 15RF | 20F | 67F* |
|---|---|---|---|---|---|---|
| % Polyamide wetting agent | 30 | 30 | 30 | 30 | 30 | — |
| % Modified mixture of acids | 70 | — | — | — | — | — |
| % Modified tall oil fatty acids | — | — | 10 | 15 | 20 | 67 |
| % Modified tall oil resin acids | — | 20 | 10 | 15 | — | — |
| % Distilled tall oil fatty acids (unreacted/unmodified) | — | 50 | 50 | 40 | 50 | — |

*In 67F, the maximum amount of modified fatty acids was used and blended with 33% ester-olefin blend solvent to obtain suitable pouring characteristics.

The acid mixture component of blend D2 contained about 40% resin acids and about 60% fatty acids, making a final blend (adducted 12% by weight). The blend D2 had an acceptable viscosity containing roughly 3% modified resin acids and 5% modified fatty acids, according to U.S. Pat. No. 6,620,770. Blends 20R, 10RF, 15RF, and 20F reflected advantages of the present invention, achieving significantly higher concentrations of modified tall oil acid compounds, without suffering from undesirably high viscosity. For instance, Blend 15RF contained 30% by weight modified fatty and resin acids, but had similar or lower viscosity than the D2 blend, as shown in Table 2.

TABLE 2

| Sample Mark | D2 | 15RF |
|---|---|---|
| Viscosity at 70-80° F., cP | 3,813 | 4,172 |
| Viscosity at 40° F., cP | 20,716 | 15,917 |

The formulations were used in preparing formulations of synthetic or oil-based drilling fluids, typical of those used in the field, and all of which comprised invert emulsions. Specifically, samples of drilling fluids were prepared comprising a synthetic or mineral oil base, to which additives were added, including the product of the invention or a known emulsifier for comparison. The different samples were subjected to different conditions, such as high temperatures or hot rolling, for comparison of performance and properties. The results of these tests are tabulated in Tables 3-4 and discussed further below.

Experiment #1

Samples of drilling fluid formulations using a mineral oil base were prepared to have densities of 16.0 pounds per gallon, with OWR values of 80/20 and WPS concentrations of 250,000 ppm calcium chloride. The specific components for each sample were as follows: 171.5 ml ESCAID® 110 mineral oil base, 45.9 mL water, 4 g organophilic clay, a 4 g emulsifier blend selected from the test samples having the formulations set forth in Table 1, 4 g calcium hydroxide, 15.9 g calcium chloride salt, 1 g polymeric fluid loss agent, 8 g EZ MUL® NT secondary emulsifier, 433 g BAROID® barite weighting agent, 20 g Rev Dust calcium montmorillonite, and 1.5 g X-VIS™ yield activator. The trademark ESCAID® belongs to ExxonMobil Corp. All other trademarks are the property of Halliburton Energy Services, Inc. and all of the products are available from Halliburton Energy Services, Inc. in Houston, Tex.

The properties of these sample drilling fluid formulations were measured according to standard procedure API Recommended Practice 13B-2 (3d ed. February 1998) initially and then again after heat rolling at 350° F. A Silverson high shear mixer was used initially to subject the fluids to conditions similar to those in operational environments. Results are shown in Table 3.

TABLE 3

16 lb/gal Mineral Oil Based Fluids with 80/20 OWR and 250,000 ppm WPS

| Sample Mark | 9 | 10 | 11 | 12 | 13 | 14 |
|---|---|---|---|---|---|---|
| Modified blend | D2 | 20R | 10RF | 15RF | 20F | 67F |

Samples prepared in 350 mL volumes using a Multi-mixer

| | | | | | | |
|---|---|---|---|---|---|---|
| Silverson @7000 rpm, min | 5 | 5 | 5 | 5 | 5 | 5 |
| Hot rolled @150° F., hr | 16 | 16 | 16 | 16 | 16 | 16 |
| Hot rolled @350° F., hr | — | 16 | — | 16 | — | 16 | — | 16 | — | 16 | — | 16 |
| Temperature, ° F. | 120 | | | | | |
| Plastic viscosity, cP | 44 | 36 | 41 | 33 | 37 | 32 | 43 | 35 | 39 | 34 | 39 | 30 |
| Yield point, lb/100 ft² | 26 | 13 | 21 | 14 | 22 | 16 | 24 | 17 | 22 | 18 | 19 | 8 |
| Elec. stability @120° F., v | 1446 | 680 | 1489 | 660 | 1515 | 706 | 1341 | 769 | 1600 | 842 | 1189 | 790 |
| HTHP filtrate @350° F., ml | 3.0 | 27.2 | 4.0 | 19.2 | 4.8 | 16.4 | 2.8 | 13.6 | 3.4 | 14.2 | 7.2 | 14.0 |
| Water/emulsion, ml corr. | — | 1.0 | — | 0.5 | — | 0.1 | — | — | — | 0.1 | — | — |

Fann 35 dial readings

| 600 rpm | 114 | 85 | 103 | 80 | 96 | 80 | 110 | 87 | 100 | 86 | 97 | 68 |
| 300 rpm | 70 | 49 | 62 | 47 | 59 | 48 | 67 | 52 | 61 | 52 | 58 | 38 |
| 200 rpm | 54 | 37 | 48 | 36 | 46 | 37 | 51 | 40 | 47 | 40 | 45 | 28 |
| 100 rpm | 37 | 24 | 32 | 24 | 32 | 25 | 35 | 26 | 32 | 26 | 30 | 18 |
| 6 rpm | 17 | 8 | 14 | 9 | 15 | 9 | 15 | 10 | 15 | 10 | 11 | 6 |

TABLE 3-continued 16 lb/gal Mineral Oil Based Fluids with 80/20 OWR and 250,000 ppm WPS

| Sample Mark | 9 | | 10 | | 11 | | 12 | | 13 | | 14 | |
|---|---|---|---|---|---|---|---|---|---|---|---|---|
| Modified blend | D2 | | 20R | | 10RF | | 15RF | | 20F | | 67F | |
| 3 rpm | 16 | 7 | 13 | 8 | 14 | 8 | 14 | 9 | 14 | 9 | 10 | 5 |
| Tau zero, lb/100 ft$^2$ | 15.2 | 6.7 | 12.5 | 7.8 | 13.6 | 7.5 | 13.2 | 8.5 | 13.6 | 8.3 | 9.3 | 5.1 |

The following performance trends were indicated by these results:

The blends in Samples 10-14 contained higher concentrations of modified tall oil acids, and provided enhanced filtration control over the blend in Sample 9 made with a modified fatty acid/resin acid mixture.

A combination of modified fatty acids and resin acids performed better than an equivalent amount of modified resin acids.

No organophilic clay was used, and no additional fluid loss additives were included apart from the blends of the invention. As with Experiment #1, the properties of these sample drilling fluid formulations were measured according to standard procedure API Recommended Practice 13-B 2 initially and then again after heat rolling at 300° F. A Silverson high shear mixer was used initially to subject the fluids to conditions similar to those in operational environments. Results are shown in Table 4.

TABLE 4

16 lb/gal ACCOLADE ® Fluids with 80/20 OWR and 250,000 ppm WPS

| Sample Mark | 15 | | 16 | | 17 | | 18 | | 19 | |
|---|---|---|---|---|---|---|---|---|---|---|
| Modified blend | D2 | | 20R | | 10RF | | 15RF | | 20F | |
| Samples prepared in 350 mL volumes using a Multi-mixer | | | | | | | | | | |
| Silverson @7000 rpm, min | 5 | | 5 | | 5 | | 5 | | 5 | |
| Hot rolled @150° F., hr | 16 | | 16 | | 16 | | 16 | | 16 | |
| Hot rolled @300° F., hr | — | 16 | — | 16 | — | 16 | — | 16 | — | 16 |
| Temperature, ° F. | | | | | 120 | | | | | |
| Plastic viscosity, cP | 39 | 37 | 36 | 35 | 36 | 35 | 38 | 35 | 37 | 35 |
| Yield point, lb/100 ft$^2$ | 23 | 16 | 28 | 16 | 32 | 21 | 24 | 21 | 31 | 20 |
| Electrical stability @120° F., v | 1259 | 1054 | 1245 | 918 | 1439 | 1212 | 1374 | 1134 | 1547 | 1198 |
| HTHP filtrate @300° F., ml | 3.0 | 23.2 | 3.6 | 26.0 | 12.0 | 23.0 | 3.6 | 7.6 | 4.2 | 23.2 |
| Fann 35 dial readings | | | | | | | | | | |
| 600 rpm | 101 | 90 | 100 | 86 | 104 | 61 | 100 | 91 | 105 | 90 |
| 300 rpm | 62 | 53 | 64 | 51 | 68 | 56 | 62 | 56 | 68 | 55 |
| 200 rpm | 48 | 41 | 50 | 39 | 55 | 44 | 49 | 43 | 54 | 43 |
| 100 rpm | 33 | 27 | 35 | 25 | 39 | 30 | 33 | 29 | 38 | 29 |
| 6 rpm | 11 | 9 | 15 | 9 | 19 | 11 | 13 | 10 | 17 | 11 |
| 3 rpm | 10 | 8 | 13 | 8 | 17 | 10 | 11 | 8 | 15 | 10 |
| Tau zero, lb/100 ft$^2$ | 8.6 | 7.4 | 12.4 | 7.4 | 16.4 | 9.0 | 10.5 | 7.5 | 14.2 | 9.2 |

Samples 12-14 had very similar HTHP filtrates after hot rolling.

These results indicate that modified fatty acids can provide properties equal to or better than combinations of modified fatty acids and modified resin acids.

Blend 67F did not provide significant advantages over 20F with respect to the initial HTHP filtrate and retention of rhelogical properties after hot rolling.

Experiment #2

Samples of drilling fluid formulations using a synthetic oil base without the addition of organophilic clays were prepared to have densities of 16.0 pounds per gallon, with OWR values of 80/20 and WPS concentrations of 250,000 ppm calcium chloride. The specific components for each sample were as follows: 175.4 mL ACCOLADE® synthetic oil base, 23.1 mL water, 28.4 mL of calcium chloride (1.39 sg) solution, 4 g emulsifier blend, 2.5 g calcium hydroxide, 7.5 g LE SUPER-MUL™ secondary emulsifier, 431 g BAROID® barite weighting agent, 20 g Rev Dust calcium montmorillonite, and 0.6 g RHEMOD® L viscosifier. All trademarks are the property of Halliburton Energy Services, Inc. and all of the products are available from Halliburton Energy Services, Inc. in Houston, Tex.

An additional HTHP filtrate test on Sample 18 after hot rolling showed 7.8 mL, confirming prior results.

The following performance trends were indicated by these results:

In these formulations, only Blend 15RF maintained relatively stable filtration control and rheological properties.

The other blends showed HTHP filtrates increasing to 23 mL or more after hot rolling.

Filter cakes, formed by filtration testing, were only 4/32" for Sample 18.

Filter cakes were 9 or 10/32" for the other Samples.

The experimental results shown in the tables above generally indicate that the product of the invention has emulsion-forming capabilities comparable to the capabilities of the product of U.S. Pat. No. 6,620,770, which itself as indicated by that patent has emulsion-forming capabilities exceeding prior art emulsifiers at only about one-third the concentration of prior art emulsifiers and improves the electrical stability of the drilling fluid, even after heat stress. These results also show that the product of the invention imparts very low filtration properties to the drilling fluids and provides better HTHP filtrate results than the product of U.S. Pat. No. 6,620, 770, after hot rolling the fluids at 300° F. or 350° F. Further, the product of the invention provides significantly better filtration control than conventional emulsifiers, especially when used with wetting agent, even after solids and brine contamination, and even at temperatures as high as 350° F. Still further, the tests showed that almost no fluid loss control additives were needed when the product of the invention was used at such high temperatures. The tests also indicate that the product of the invention performs well with other emulsifying products, which should allow simpler maintenance treatments in oil or synthetic based fluids when using the product of the invention.

Table 3 especially demonstrates that while all of the formulations of the present invention performed well, the product of the invention is capable of yielding excellent performance even without resin acids, in fluids comprising organophilic clay.

Table 4 shows an application of the products in a system with no organophilic clay present. In this system, the product of the invention comprising both distilled and processed tall oil fatty acids and distilled and processed tall oil resin acids yielded the best results.

Overall, these test results indicate that distilled and processed tall oil fatty acids and distilled and processed tall oil resin acids may be used alone or together in a blend with polyamide for the product of the present invention to yield at least the same and possibly even better performance than the product of U.S. Pat. No. 6,620,770. Generally, when the distilled and processed tall oil fatty acids and distilled and processed tall oil resin acids are both used in comprising the product of the invention, the overall properties are superior to those of the product of U.S. Pat. No. 6,620,770, and impart improved Theological stability to the drilling fluid at temperatures as high as 350° F. Such blends of the product of the invention afford a greater concentration of adducted fatty acids and adducted resin acids in the product than can practically be accomplished with the product of U.S. Pat. No. 6,620,770. Also, such distilled and processed tall oil resin acids include fewer unmodified resin acids (i.e., have fewer acids without adducts), than typically found with resin acids comprising the product of U.S. Pat. No. 6,620,770, which is believed to result in better product storage stability for the product of the present invention.

The foregoing description of the invention is intended to be a description of preferred embodiments. Various changes in the details of the described product and method can be made without departing from the intended scope of this invention as defined by the appended claims.

What is claimed:

1. A method for improving or facilitating the emulsification of an oil or synthetic based drilling fluid or a drilling fluid comprising an invert emulsion at temperatures up to and including about 350° F., said method comprising adding to said drilling fluid a blend of carboxylic acid terminated polyamide and distilled maleic anhydride adducted tall oil fatty acids.

2. The method of claim 1 further comprising in said blend distilled maleic anhydride adducted tall oil resin acids.

3. A method for improving the filtration properties of an oil or synthetic based drilling fluid or a drilling fluid comprising an invert emulsion at temperatures up to and including about 350° F., said method employing adding to said drilling fluid a blend of a carboxylic acid terminated polyamide and distilled, maleic anhydride-adducted tall oil fatty acids.

4. The method of claim 3 wherein said blend further comprises distilled, maleic anhydride adducted tall oil resin acids.

5. A method for improving the eletrical stability of an oil or synthetic based drilling fluid, or a drilling fluid comprising an invert emulsion, at temperatures up to and including about 350° F., said method comprising adding to said fluid a blend of a carboxylic acid terminated polyamide and distilled, maleic anhydride-adducted tall oil fatty acids.

6. The method of claim 5 wherein said blend further comprises distilled, maleic anhydride-adducted tall oil resin acids.

7. A method for emulsifying an invert emulsion based drilling fluid with stability at high temperatures, said method comprising using an emulsifier formulated from two primary components comprising a wetting agent and fatty acids multiply distilled from tall oil and processed by adduction, wherein the wetting agent is selected from the group consisting of carboxylic acid-terminated polyamides, lecithin, and long hydrocarbon chain cationic surfactants.

8. The method of claim 7 wherein said emulsifier further comprises resin acids multiply distilled from tail oil and processed by adduction which are mixed with said distilled and processed tall oil fatty acids and wherein said adduction of said resin acids and said adduction of said fatty acids occurred before said mixing.

9. The method of claim 8 wherein said emulsifier has a pour point at temperatures as low as about 20 ° F. with minimal solvent.

10. The method of claim 8 wherein said adduction of said resin acids and said fatty acids is by cyclo addition or ene substitution.

11. The method of claim 7 wherein said high temperatures include temperatures as high as about 350° F. and said stability includes fluid loss control without addition of fluid loss control additives.

12. A method for preparing a drilling fluid for use at high temperatures, said method comprising formulating said drilling fluid with an invert emulsion base and an emulsifier comprising a wetting agent and fatty acids multiply distilled from tall oil and adducted by cyclo addition or ene substitution, wherein the wetting agent is selected from the group consisting of carboxylic acid-terminated polyamides, lecithin, and long hydrocarbon chain cationic surfactants.

13. The method of claim 12 wherein said emulsifier further comprises resin acids that have been multiply distilled from tall oil and adducted by cyclo addition or ene substitution, wherein said resin acids and said fatty acids are mixed together after said adduction of each.

14. The method of claim 12 wherein said emulsifier is saponified.

15. A method for preparing a drilling fluid for use at high temperatures, said method comprising formulating said drilling fluid with an invert emulsion base and an emulsifier comprising a blend of wetting agent and resin acids multiply distilled from tall oil and adducted by cyclo addition or ene substitution, wherein the wetting agent is selected from the group consisting of carboxylic acid-terminated polyamides, lecithin, and long hydrocarbon chain cationic surfactants.

16. The method of claim 15 wherein said emulsifier is saponified.

17. The method of claim 1 wherein the carboxylic acid-terminated polyamidc is concentrated or about 90% active.

18. The method of claim 7 wherein the carboxylic acid-terminated polyamide is concentrated or about 90% active.

19. The method of claim 12 wherein the carboxylic acid-terminated polyamide is concentrated or about 90% active.

20. The method of claim 15 wherein the carboxylic acid-terminated polyamide is concentrated or about 90% active.

* * * * *